United States Patent [19]

Fukuzawa et al.

[11] Patent Number: 5,066,217
[45] Date of Patent: Nov. 19, 1991

[54] CLAMPING APPARATUS FOR AN INJECTION MOLDING MACHINE

[75] Inventors: Shigeo Fukuzawa; Takahide Kaneko; Masaaki Fujimura, all of Yamaguchi, Japan

[73] Assignee: Ube Industries, Ltd., Ube, Japan

[21] Appl. No.: 564,188

[22] Filed: Aug. 8, 1990

[51] Int. Cl.$^5$ .............................................. B29C 45/66
[52] U.S. Cl. ................................. 425/589; 425/451.7; 425/451.9; 425/595
[58] Field of Search ................. 425/589, 595, 451.7, 425/451.9

[56] References Cited

U.S. PATENT DOCUMENTS

| 3,669,599 | 6/1972 | Snider et al. | 425/595 |
| 4,874,309 | 10/1989 | Kushibe et al. | 425/589 |

FOREIGN PATENT DOCUMENTS

| 60-212320 | 10/1985 | Japan . |
| 63-317243 | 12/1988 | Japan . |
| 1-2773 | 1/1989 | Japan . |
| 1-69320 | 3/1989 | Japan . |

Primary Examiner—Timothy Heitbrink
Attorney, Agent, or Firm—Kanesaka and Takeuchi

[57] ABSTRACT

A clamping system includes a fixed platen fixed to one end of a machine base and a plurality of clamping cylinders, the fixed platen holding a fixed mold therein, a movable platen fixed to the other end of the machine base and holding a movable mold therein, a plurality of tie bars extending through the movable platen and including pistons at their one ends, the pistons being slidably received within the clamping cylinders, and screw threads or grooves substantially at its longitudinal center, a unit disposed between the movable platen and the fixed platen and operable to move the movable platen to and from the fixed platen, and two-part nuts mounted to the movable platen and meshingly engageable with the screw threads or grooves of the tie bars. When the total thickness of the fixed mold and the movable mold is exactly divisible by the pitch of the two-part nut, the tie bars are so sized that the screw threads or grooves can be brought into meshing engagement with the two-part nuts while the pistons are located in a rearward position. When there is a remainder, adjuster is operative to move the two-part nuts into meshing engagement with the screw threads or grooves of the tie bars. Such adjuster is disposed between the movable platen and the two-part nuts.

6 Claims, 8 Drawing Sheets

CLAMPING APPARATUS FOR AN INJECTION MOLDING MACHINE

FIELD OF THE INVENTION AND RELATED ART STATEMENT

The present invention relates to a clamping system for use in an injection molding machine, a die casting machine or a press.

FIG. 8 is a longitudinal sectional view of a conventional clamping system as disclosed in Japanese utility model application No. 63/114970 filed prior to the filing date of the instant application.

In FIG. 8, the prior art clamping system generally includes a fixed platen 10, a movable platen 20, tie bars 7, two-part nuts 22, nut boxes 21, a connecting plate 50, clamping cylinders 3, approaching cylinders 2, a fixed or female mold 30a, a movable or male mold 30b, stopper boxes 33, compression springs 32, rollers 36, and stoppers 34.

More specifically, the fixed mold 30a is mounted to the fixed platen 10 which is, in turn, fixed to one end of a machine base 1. The movable mold 30b is mounted to the movable platen 20 which is, in turn, located at the other end of the machine base 1. The approaching cylinders 2 are fixed to the fixed platen 10. Each of the piston rods 6 has one end connected to the movable platen 20 and can reciprocatingly slide on the machine base 1 with respect to the fixed platen 10. A plurality of tie bars 7 (four tie bars), each having the same diameter through its length, extends through the movable platen 20. Each of the tie bars 7 has one end connected to a piston 5 slidable within each of the clamping cylinders 3 and the other end extending substantially perpendicularly through the connecting plate 50 and secured thereto by a nut or end plate 51. Keys are used to prevent rotation of the tie bars 7 relative to the connecting plate 50. The tie bars 7 have screw threads or grooves 8, substantially at their center, which come into mesh with the two-part nuts 22 so as to lock the movable platen 20 onto the tie bars 7. Formed at one side of each of the screw threads or grooves 8 is a recess 9 which includes a stopper surface 9a containing a line extending at right angles to the axis of the tie bar 7 and an inclined surface 9b extending from the stopper surface 9a toward the movable platen 20. The stoppers 34 are contained in the stopper boxes 33 which are, in turn, fixed to the movable platen 20. Each of the stoppers 34 is normally pressed in a direction at right angles to the axis of the tie bar 7 or against the bottom of the recess 9. The stopper 34 is slidable on the inclined surface 9b and can be brought into contact with the stopper surface 9a of the recess 9. In the illustrated embodiment, stopper means comprises the stopper boxes 33, the compression springs 32, the stoppers 34, the shafts 31, the bushes 35 and the rollers 36. Specifically, each of the stoppers 34 is slidable vertically within the stopper box 33. The vertical shaft 31 has one end connected to the stopper 34 and the other end extending upwardly through the stopper box 33. Each of the rollers 36 is rotatably supported by a support shaft 36a which is, in turn, mounted to the lower portion of the stopper 34. The roller 36 is normally pressed against the tie bar 7 by the compression spring 32 and movable axially along the tie bar 7 upon movement of the movable platen 20. Each of the two-part nuts 22 is incorporated in the nut box 21 which is, in turn, fixedly mounted to the movable platen 20. When the molds are clamped, the two-part nuts 22 are brought into meshing engagement with the screw threads or grooves 8 of the tie bars 7 by a hydraulic unit (not shown).

Operation of the prior art clamping system will now be described.

In FIG. 8, hydraulic oil is first introduced into a chamber 4a of each of the approaching cylinders 2, where the piston rod 6 is located, so as to cause the movable platen 20, together with the nut boxes 21 and the stopper boxes 33, to move toward the fixed platen 10 along the tie bars 7. At this time, the rollers 36 are rotatably moved on the tie bars 7. The screw threads or grooves 8 of the tie bars 7 are then smoothly inserted into through holes 24 of the movable platen 20. While the movable platen 20 is approaching the fixed platen 10, the nut boxes 21 pass through the recesses 9 of the tie bars 7. Immediately thereafter, the two-part nuts 22 are brought into meshing engagement with the screw threads or grooves 8 by the hydraulic unit. The stoppers 34, which is pressed by the compression springs 32 to project from the stopper boxes 33, thus come into contact with the corresponding stopper surfaces 9a of the recesses 9. This contact ensures meshing engagement of the two-part nuts 22 with the screw threads or grooves 8. A further supply of hydraulic oil to the chambers 4a of the approaching cylinders 2 causes the movable platen 20 to move closer to the fixed platen 10. Finally, hydraulic oil is introduced into chambers 5a of the clamping cylinders 3, where piston rods are located, to initiate clamping of the molds. Under the circumstances, injection molding is carried out.

Again, in the prior art system, while the movable platen 20 is being moved toward the fixed platen 10 by the approaching cylinders 2, the rollers 36 move on the inclined surfaces 9b of the recesses 9. At this stage, the stoppers 34 project from the stopper boxes 33 under the action of the compression springs 32. The fronts of the stoppers 34 then come into contact with the stopper surfaces 9a, and the two-part nuts 22 are thereby brought into meshing engagement with the screw threads or grooves 8 of the tie bars 7. Thereafter, hydraulic oil is introduced into the chambers 4a of the approaching cylinders 2 so as to bring the molds 30a, 30b into light contact with one another. Under the circumstances, clamping is effected.

When the movable mold 30b and the fixed mold 30a are in contact with one another, the front surface of each of the stoppers 34 and the stopper surface 9a are locked at the same point. As a result, there must be provided means for adjusting the thickness of the molds. The clamping cylinders 3 must perform such a function.

OBJECT AND SUMMARY OF THE INVENTION

It is an object of the present invention to provide a clamping system which requires a shorter stroke than a conventional system, and which ensures positive meshing engagement of tie bars with two-part nuts by an adjuster, without the need for steps.

It is another object of the invention to provide a clamping system which requires less amount of hydraulic oil and thus a smaller oil supply system and which enables a shorter molding cycle.

According to the present invention, a clamping system includes a fixed platen fixed to one end of a machine base and a plurality of clamping cylinders, the fixed platen holding a fixed mold therein, a movable platen fixed to the other end of the machine base and holding a movable mold therein, a plurality of tie bars extending through the movable platen and including pistons at their one ends, the pistons being slidably received within the clamping cylinders, and screw threads or grooves substantially at its longitudinal center, a unit disposed between the movable platen and the fixed platen and operable to move the movable platen to and from the fixed platen, and two-part nuts mounted to the movable platen and meshingly engageable with the screw threads or grooves of the tie bars. When the total thickness of the fixed mold and the movable mold is exactly divisible by the pitch of the two-part nut, the tie bars are so sized that the screw threads or grooves can be brought into meshing engagement with the two-part nuts while the pistons are located in a rearward position. When there is a remainder, adjuster is operated to move the two-part nuts into meshing engagement with the screw threads or grooves of the tie bars. Such adjuster means is disposed between the movable platen and the two-part nuts.

With this arrangement, hydraulic oil is introduced into chambers of the approaching cylinders until the movable mold is lightly contacted with the fixed mold. Thereafter, hydraulic oil is introduced into chambers of cylinders for opening and closing the two-part nuts, and the adjuster is rendered operative to move the two-part nuts into meshing engagement with the screw threads or grooves of the tie bars. Upon complete engagement, hydraulic oil is introduced into chambers of the clamping cylinders so as to initiate clamping of the two molds.

In the conventional system, when the stoppers come into contact with the steps, the two-part nuts are meshed with the screw threads or grooves despite the thickness of each mold. Accordingly, the mold opening stroke is constant during separation of the molds. However, the clamping cylinders must have strokes in response to the thickness of molds.

In the present system, the approaching cylinders are used to move the movable platen, despite the thickness of the molds, and the clamping cylinders are used solely to clamp the molds. The clamping system of the present invention requires less amount of hydraulic oil and thus, a smaller oil supply system and enables a shorter molding cycle.

In the clamping system of the present invention, rams may be in contact with the pistons within the clamping cylinders and is slidable within ram cylinders. The diameter of each ram is smaller than that of the piston.

With this arrangement, hydraulic oil is introduced into chambers of the approaching cylinders until the movable mold is lightly contacted with the fixed mold. Thereafter, hydraulic oil is introduced into chambers of cylinders for opening and closing the two-part nuts, and the adjuster is rendered operative to move the two-part nuts into meshing engagement with the screw threads or grooves of the tie bars. Upon complete engagement, hydraulic oil is introduced into chambers of the clamping cylinders so as to initiate clamping of the two molds. In opening the movable mold from the fixed mold, oil is removed from the chambers of the clamping cylinders, whereas hydraulic oil is introduced to the ram chambers. In the present system, the clamping cylinders have a short stroke, and only a small amount of oil is necessary to effect clamping and opening of the molds.

BRIEF DESCRIPTION OF THE DRAWINGS

A better understanding of the invention may be had by reference to the following description of preferred embodiments when taken in conjunction with the accompanying drawings, in which:

FIG. 1 is a longitudinal sectional view of the clamping system wherein the two-part nuts can be brought into meshing engagement with screw threads or grooves of tie bars when a movable mold comes into contact with a fixed mold;

FIG. 2 is a longitudinal sectional view of the clamping system wherein the two-part nuts can be brought into meshing engagement with screw threads or grooves of tie bars by the stroke of the clamping cylinders when a movable mold comes into contact with a fixed mold;

FIG. 3 shows a tie bar locking assembly in use;

FIG. 3A is a vertical sectional view of the two-part nut disengaged from the tie bar when hydraulic oil is introduced into chamber 15b of the cylinder;

FIG. 3B is a vertical sectional view of the two-part nut engaged with the tie bar when hydraulic oil is introduced into chamber 15a of the cylinder;

FIG. 4 is a sectional view showing springs as a means for pressing the two-part nuts;

FIG. 5 is a sectional view showing ram cylinders as a means for pressing the two-part nuts;

FIG. 6 is a sectional view of another embodiment wherein a gear is used as a part of adjuster means, in lieu of a sprocket as shown in FIGS. 1 to 5;

DESCRIPTION OF THE PREFERRED EMBODIMENTS

Figure 1:
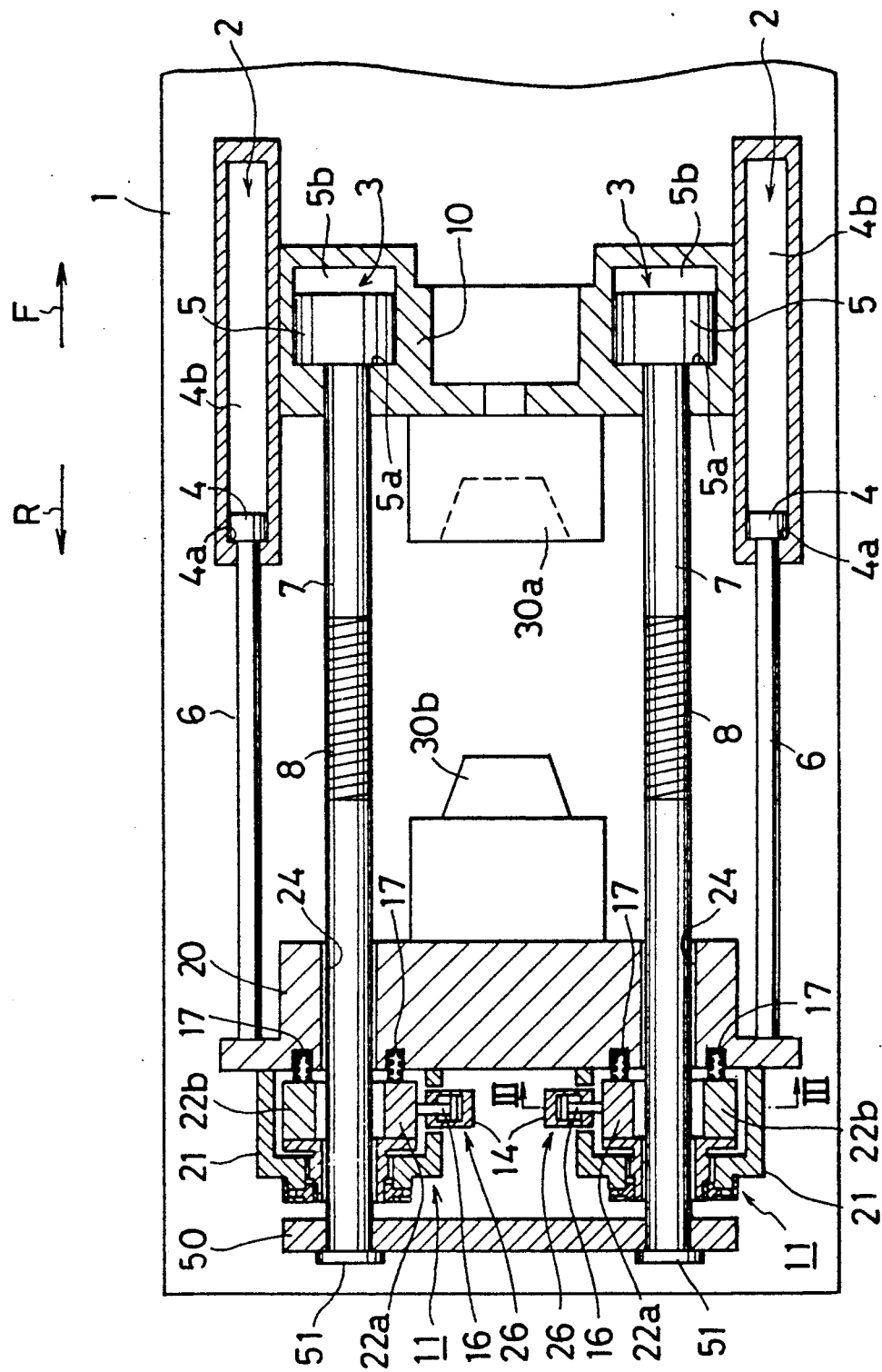
FIGS. 1 to 6 show a clamping system according to one embodiment of the present invention.
Figure 2:
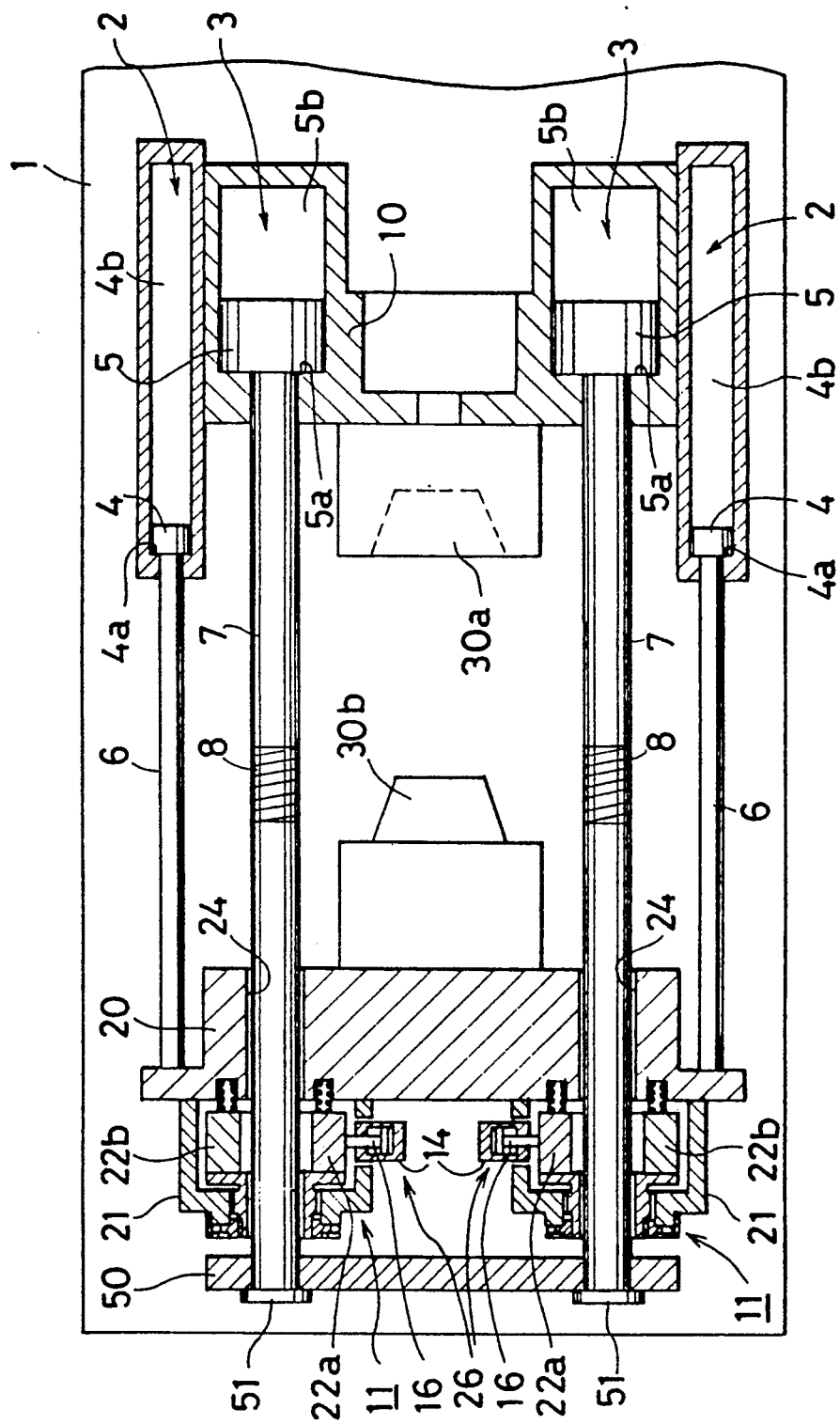
Figure 3:
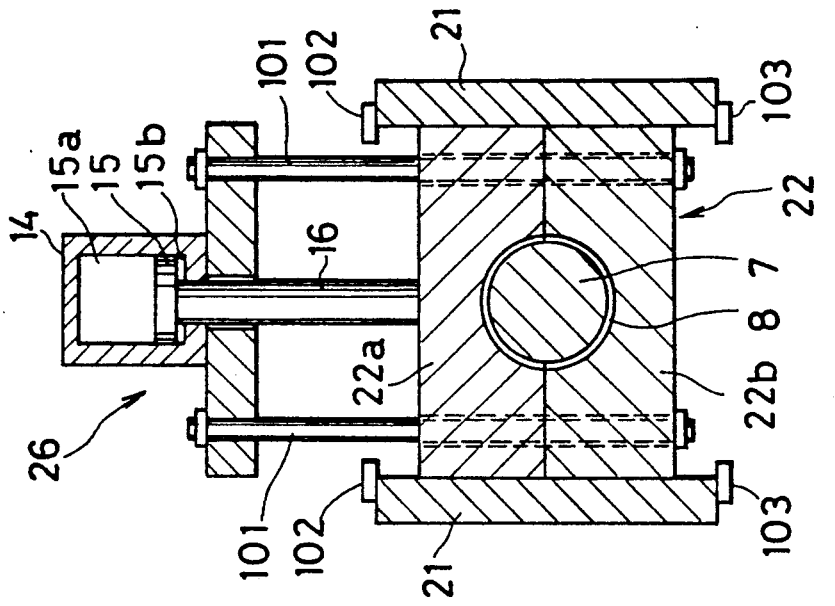

FIGS. 1 to 6 show a clamping system according to one embodiment of the present invention. FIG. 1 is a longitudinal sectional view of a clamping system wherein two-part nuts can be brought into meshing engagement with screw threads or grooves of tie bars when a movable platen comes into contact with a fixed platen. FIG. 2 is a longitudinal sectional view of the clamping system wherein the two-part nuts can be brought into meshing engagement with the screw threads or grooves of the tie bars by the stroke of the clamping cylinders when the movable mold comes into contact with the fixed mold. FIG. 3 shows a tie bar locking assembly in use. FIG. 3A is a vertical sectional view of the two-part nut disengaged from the tie bar when hydraulic oil is introduced into chamber 15b of the cylinder.

Figure 4:
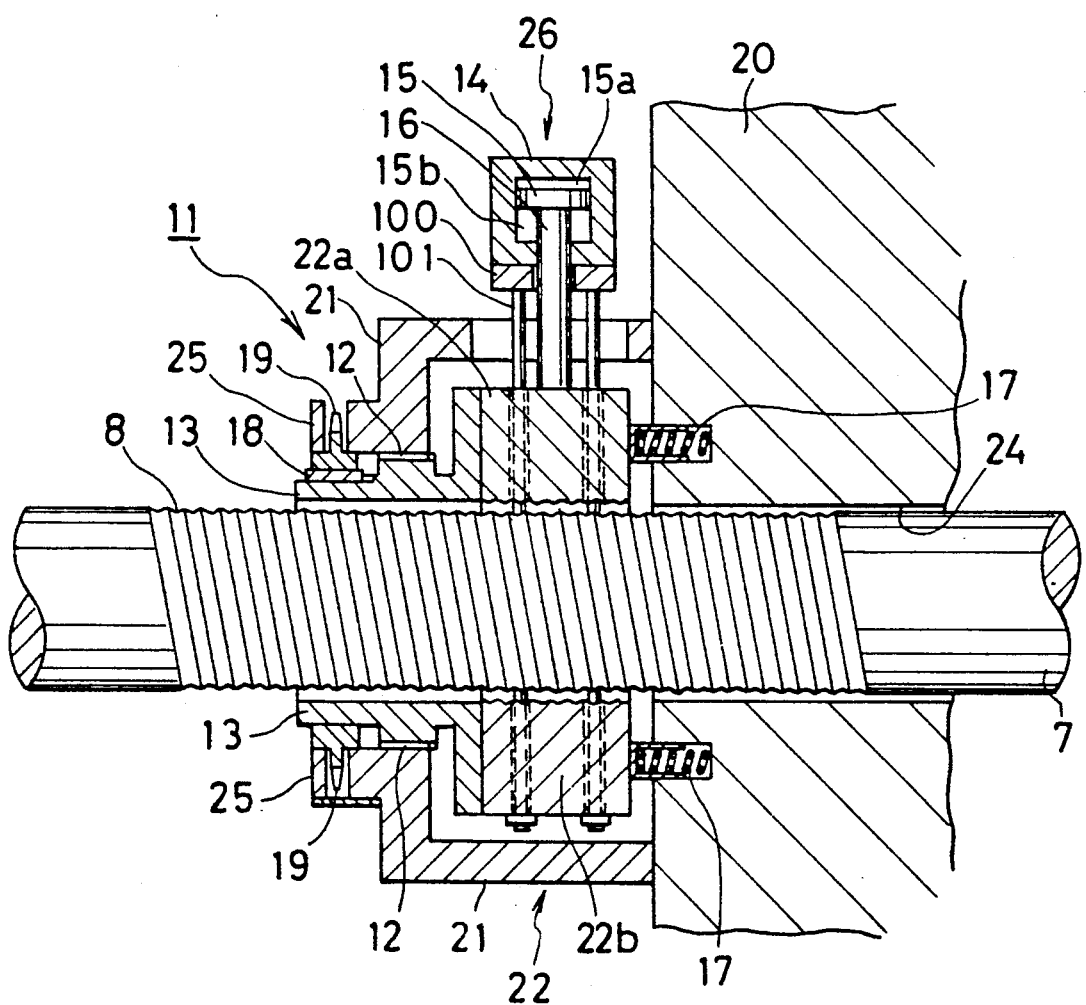
Figure 5:
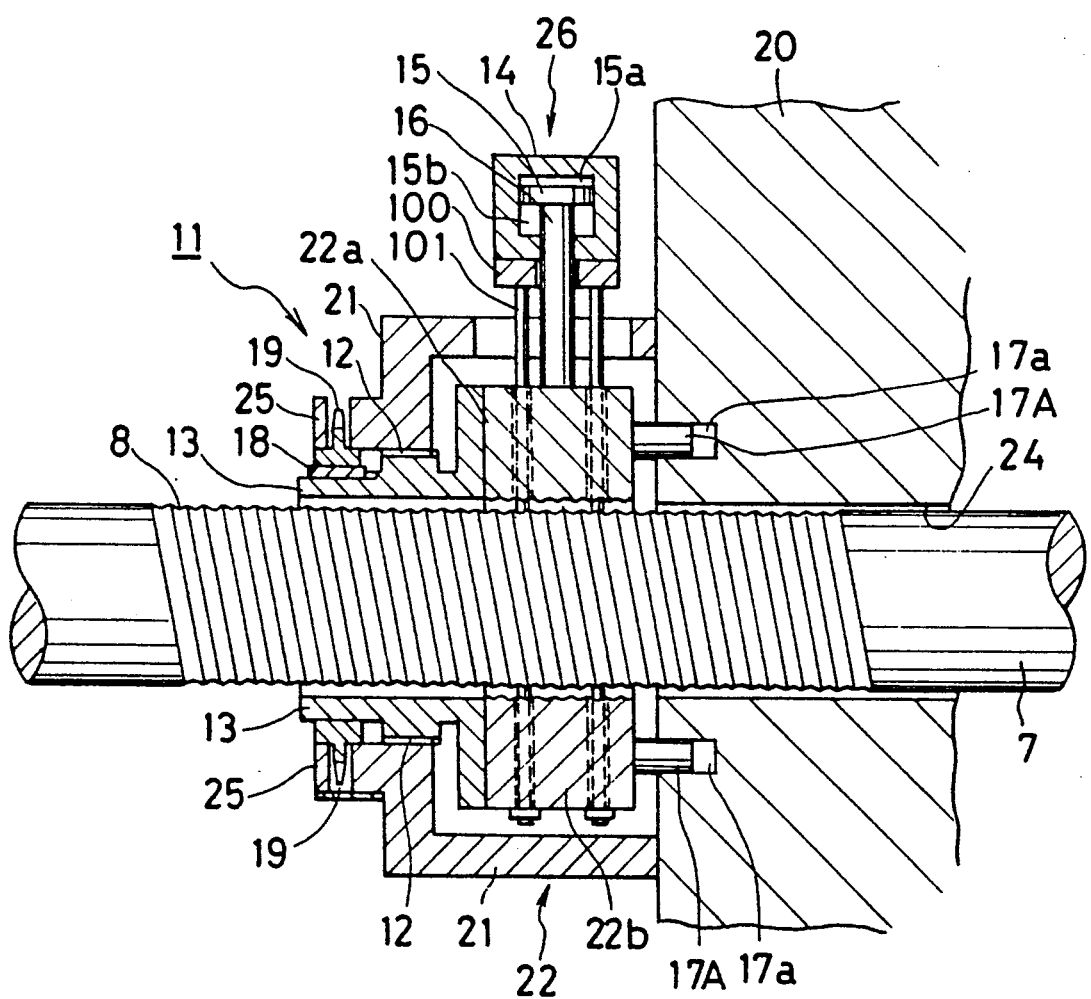
Figure 6:
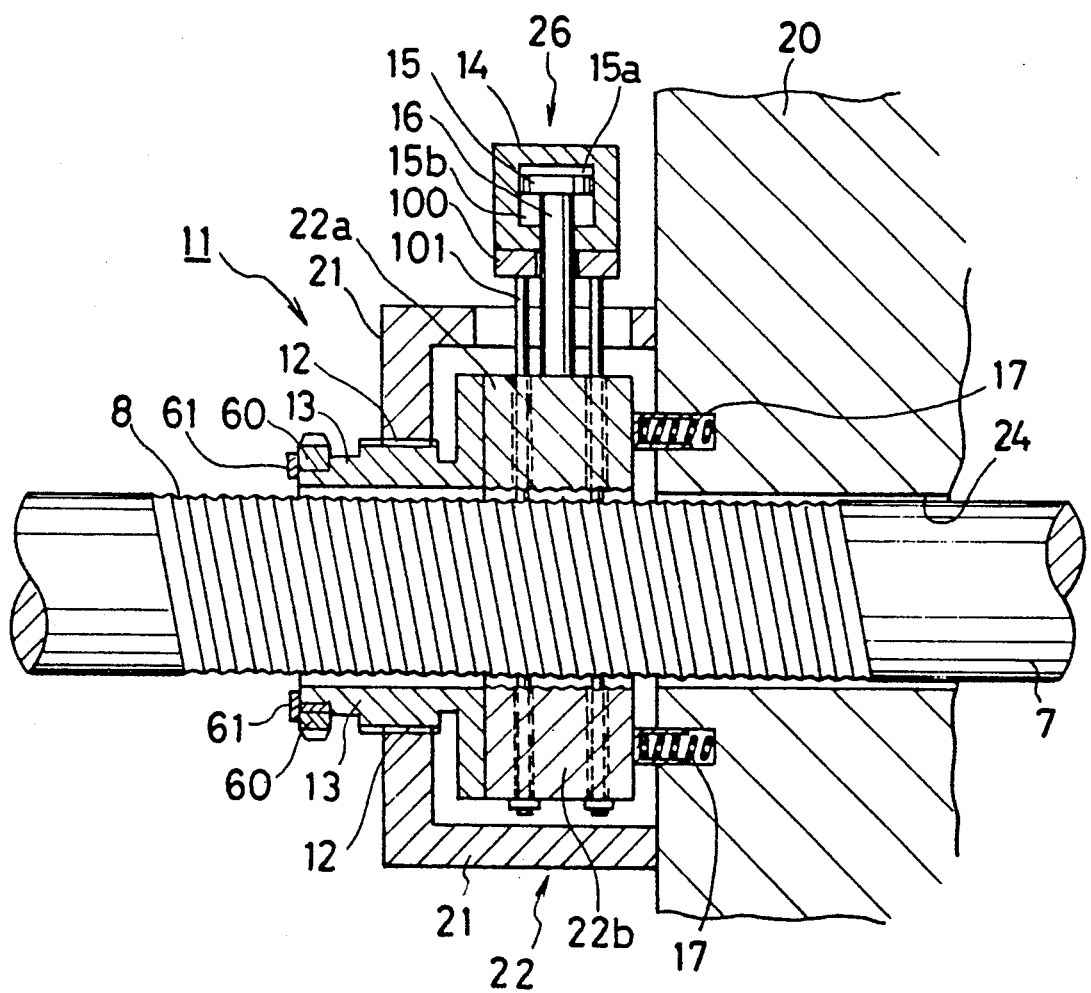

FIG. 3B is a vertical sectional view of the two-part nut engaged with the tie bar when hydraulic oil is introduced into chamber 15a of the cylinder. FIG. 4 is a sectional view showing springs as a means for pressing the two-part nuts. FIG. 5 is a sectional view showing ram cylinders as a means for pressing the two-part nuts. FIG. 6 is a sectional view of another embodiment wherein a gear is used as a part of adjuster means, in lieu of a sprocket as shown in FIGS. 1 to 5.

The present invention will now be described by way of example with reference to FIGS. 1 to 4.

With first reference to FIG. 1, a clamping system generally includes a fixed platen 10, a movable platen 20, tie bars 7, clamping cylinders 3, approaching cylinders 2, a fixed mold 30a, a movable mold 30b, a connecting plate 50, two-part nuts 22, nut boxes 21, tie bar locking means 26 and adjuster means 11.

Specifically, the fixed mold 30a is mounted to the fixed platen 10 which is, in turn, fixed to one end of a machine base 1. The movable mold 30b is mounted to the movable platen 20 which is, in turn, located at the other end of the machine base 1. The approaching cylinders 2 are fixedly mounted to opposite sides of the fixed platen 10. Each of the piston rods 6 has one end connected to the movable platen 20 and can reciprocatingly slide on the machine base 1 with respect to the fixed platen 10. The arrow F indicates a forward direction, and the arrow R indicates a rearward direction. A plurality of tie bars 7 (in the illustrated embodiment, four tie bars are provided), each having the same diameter through its length, extend through the movable platen 20. Each of the tie bars 7 has one end connected to a piston 5 slidable within each of the clamping cylinders 3 and the other end extending substantially perpendicularly through the connecting plate 50 and secured thereto by a nut or end plate 51. Keys are used to prevent rotation of the tie bars 7 relative to the connecting plate 50. The tie bars 7 have screw threads or grooves 8 substantially at their center. When the movable mold 30b is brought into contact with the fixed mold 30a, the screw threads or grooves 8 come into meshing engagement with the two-part nuts 22 so as to lock the movable platen 20 onto the tie bars 7.

The two-part nuts 22 are contained in the nut boxes 21, one end of each of which is fixed to the movable platen 20. The other end of the nut box 21 has an internally threaded hole with which a corresponding threaded portion 12 of an adjusting shaft 13 in the adjuster means 11 is engaged. The adjuster means generally includes the adjusting shafts 13 with the threaded portions 12, pressing members 17, sliding keys 18, sprockets 19, and press plates 25. Each of the adjusting shafts 13 has a through hole through which the corresponding tie bar 7 extends. The adjusting shaft 13 has a flange at one end, adjacent to the movable platen 20, which is in sliding contact with the two-part nuts 22a, 22b. Springs 17 are used to press the two-part nuts 22a, 22b against the flange of the adjusting shaft 13.

With now reference to FIGS. 3A and 3B, the tie bar locking means 26 comprises cylinders 14 for opening and closing the two-part nuts 22, pistons 15, piston rods 16, two-part nuts 22, connecting rods 101, and stoppers 102, 103.

The two-part nuts 22 are located adjacent to the movable platen 20 and each composed of an upper half portion 22a, and a lower half portion 22b. One end of each of the piston rods 16 is fixed to one end of each of the upper half portions 22a. A piston 15 is fixed to the other end of the corresponding piston rod 16 and is vertically slidable within the cylinder 14. An adjusting plate 100 is attached to the lower end of each of the cylinders 14. A pair of connecting rods 101 extend through the upper and lower half portions 22a, 22b and are located at right and left sides of the corresponding piston rod 16. Each of the connecting rods 101 has one end secured to the adjusting plate 100 and the other end secured to the lower half portion 22b of the two-part nut 22. With reference to FIG. 3A, hydraulic oil is introduced into a chamber 15b of the cylinder 14 so as to raise the piston 15 and press the cylinder 14 downwards. This causes the upper and lower half portions 22a and 22b to move away from the tie bar 7. The upper and lower half portions 22a and 22b are stopped when contacted with the stoppers 102 and 103, respectively. With reference to FIG. 3B, hydraulic oil is introduced into a chamber 15a of the cylinder 14 so as to press the piston 15 downards and raise the cylinder 14. This causes the upper and lower half portions 22a, 22b to slide within the nut box 21 for engagement with the tie bar 7.

One end of the adjusting shaft 13 is in contact with the two-part nut 22. By rotating the sprocket 19 fixed to the other end of the adjusting shaft 13, the adjusting shaft 13 is slidably moved with respect to the two-part nut 22. The movable platen 20 has a plurality of holes within which the pressing members 17 are received to constantly press the two-part nut 22 in a direction axially of the tie bar 7. When the adjusting shaft 13 is moved toward the fixed platen 10, the springs 17 are compressed. When the adjusting shaft 13 is moved away from the fixed platen 10, the springs 17 are expanded.

The sprocket 19 is formed around a free end of each of the adjusting shafts 13 and is prevented from rotating relative thereto by the sliding key 18. The sprockets are connected to a chain (not shown) which is, in turn, connected to a sprocket (not shown) integral with an output shaft of a motor (not shown). The motor is active to rotate the sprockets 19 so as to move the adjusting shafts 13 in a direction axially of the tie bar 7. This causes the two-part nuts 22 to come into meshing engagement with the screw threads or grooves 8 of the tie bars 7. The sprocket 19 is rotatably supported at one end by the nut box 21 and the other end by the press plate 25.

Operation of the clamping system thus constructed will now be described.

In order to clamp the molds together, hydraulic oil is first introduced into the chambers 4a of the approaching cylinders 2. This causes the movable platen 20 together with the nut boxes 21 and the adjuster means 11 to move toward the fixed platen 10 along the tie bars 7. The screw threads or grooves 8 formed substantially at the center of the tie bars 7 are then smoothly inserted into the through holes 24 of the movable platen 20. The movable platen 20 is further moved forwards whereby the movable mold 30b is slowly brought into contact with the fixed mold 30a. The hydraulic oil is no longer supplied to the chambers 4a of the approaching cylinders 2.

The two-part nuts 22 then begin to engage with the screw threads or grooves 8 of the tie bars 7. Hydraulic oil is supplied to the chambers 15a of the cylinders 14 through pipes (not shown) so as to permit the two-part nuts 22 to move in a direction substantially normal to the axis of each of the tie bars 7. The two-part nuts 22 are then brought into meshing engagement with the screw threads or grooves 8 of the tie bars 7. At this time, the position of the two-part nuts 22 relative to the tie bars 7 are adjusted. It will be noted that the total thickness (or die height) H of the two molds 30a, 30b when contacted together should be previously measured. In case that the value H is exactly divisible by a pitch P of the screw threads or grooves 8 of the tie bars 7, the two-part nuts 22 can be brought into complete meshing engagement with the screw threads or grooves 8 of the tie bars 7 by supplying hydraulic oil to the chambers 15a of the cylinders 14, while the two molds 30a, 30b are in light contact with one another. In case that the value H is divisible by the pitch P with the remainder, the adjusting shafts 13 must be moved for a distance A by the motor so as to bring the two-part nuts 22 into complete meshing engagement with the screw threads or grooves 8. Such a distance A can be obtained by multiplying the remainder by the pitch P of the screw threads or grooves 8 (or the pitch P of the two-part nut). It will also be noted that the speed of rotation of the motor is measured in the form of pulses so as to determine such distance A.

After the two-part nuts 22 have been completely engaged with the screw threads or grooves 8, hydraulic oil is supplied to the chambers 5a of the clamping cylinders 3 so as to initiate strong clamping of the two molds 30a, 30b. Thereafter, injection molding takes places.

Reverse operation permits the movable platen 20 to move away from the fixed platen 10 or separate the two molds 30a, 30b from one another.

Figure 8:
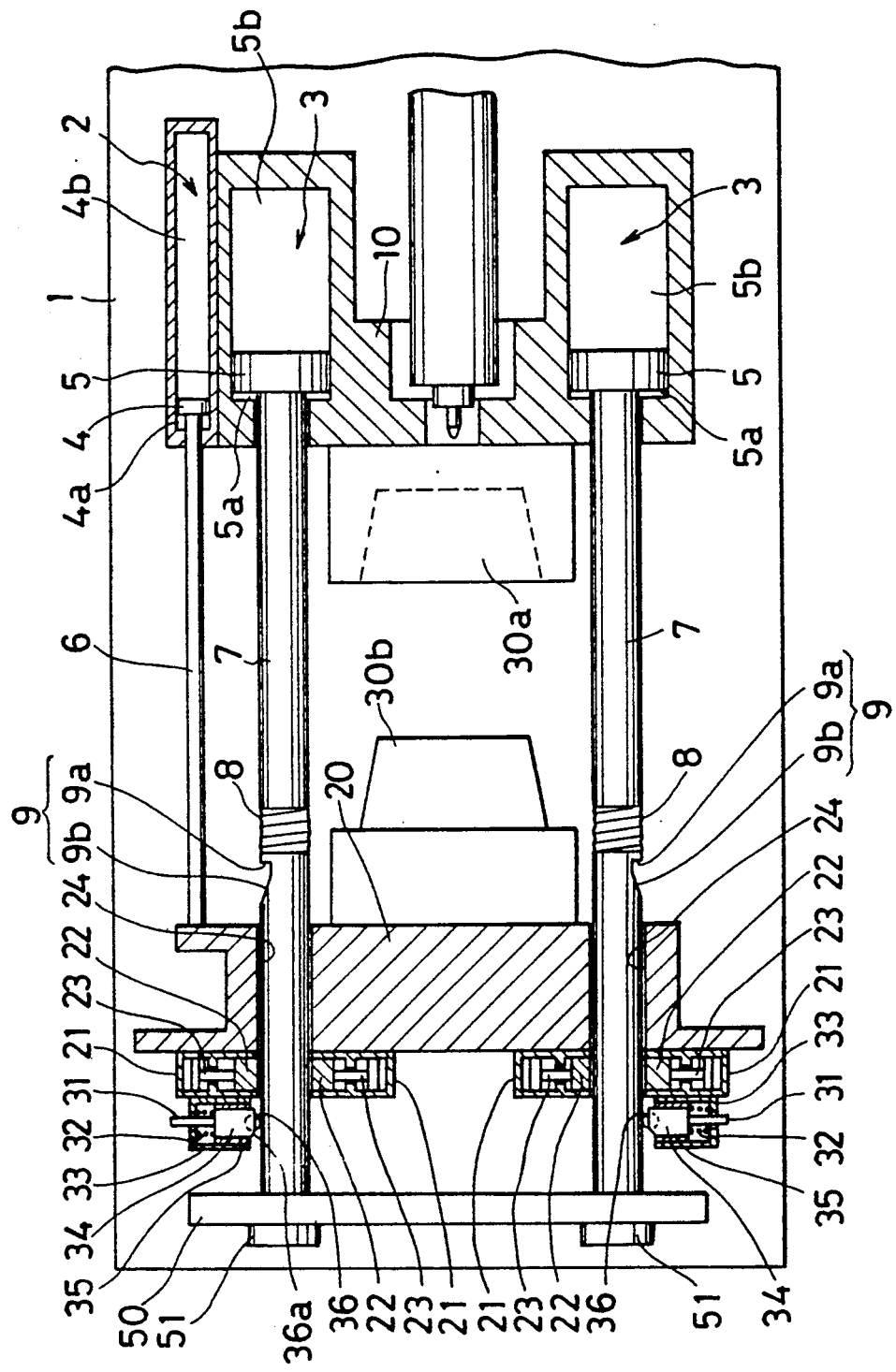
FIG. 8 is a longitudinal sectional view of a conventional clamping system.

The screw threads or grooves in the embodiment shown in FIG. 1 is longer than the screw threads or grooves of the conventional system shown in FIG. 8. Clamping is carried out by the clamping cylinders 3 after the two molds are lightly contacted with one another. In this case, the stroke of the clamping cylinders 3 is short. In the embodiment shown in FIG. 2, the screw threads or grooves 8 are shorter than the screw threads or grooves of the conventional system. Clamping is carried out by the clamping cylinders 3 after the two molds are lightly contacted with one another. In this case, the stroke of the clamping cylinders 3 is longer. The clamping cylinders 3 have means for adjusting the thickness of the molds.

In FIG. 4, the pressing member is in the form of a spring 17. Alternatively, ram chambers 17a may be formed in one side of the movable platen 20 as shown in FIG. 5. Rams 17A are fixed to one side of each of the two-part nuts 22 and are slidably received in the ram chambers 17a. Hydraulic oil or compressed air is supplied to the ram chambers 17a so as to constantly press the adjusting shafts 13 along the tie bars 7.

Also, the sprockets 19 shown in FIGS. 4 and 5 may be replaced by gears 60.

A scale sensor may be provided to automatically detect the die height H. This data is then given to a computer and is divided by the pitch P of the screw threads or grooves of the tie bar 7. When there is a remainder, then the required pulse is generated by the computer and provided to the motor which is connected though the chain to the sprockets 19. The sprockets 19 are then rotated to move the adjusting shafts 13 by a required distance A. On the other hand, when the die height is exactly divisible by the pitch P, then the hydraulic oil is supplied, upon instructions of the computer, to the chambers 15a to move the two-part nuts 22 into meshing engagement with the screw threads or grooves 8 of the tie bars 7. It will be, of course, understood that the two-part nuts 22 may be manually moved along the tie bars 7.

In the clamping system of the present invention, a ram may be slidably received within a ram cylinder and is in contact with the piston disposed within the clamping cylinder. The outer diameter of the ram is smaller than that of the piston.

Figure 7:
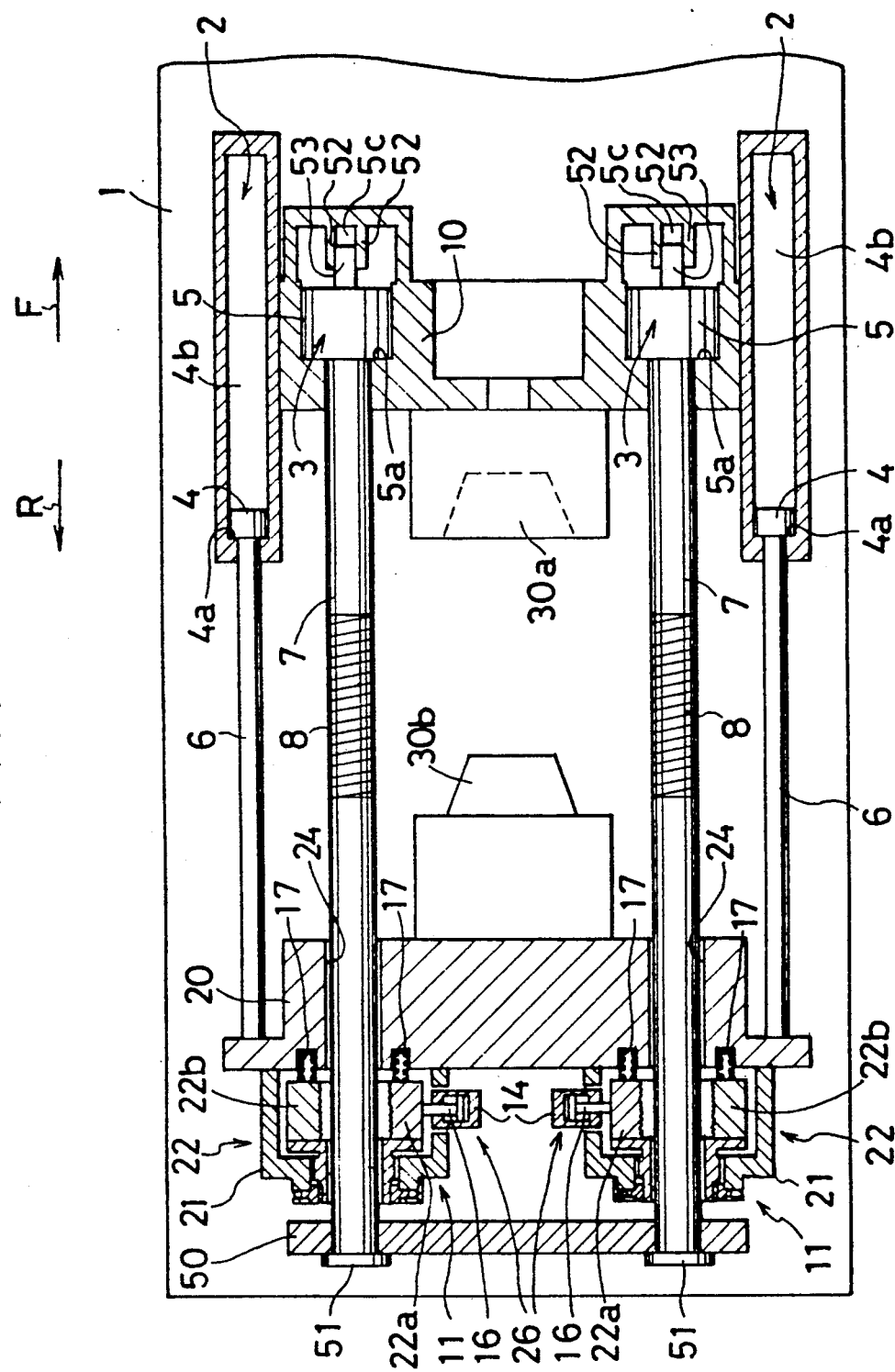
FIG. 7 is a longitudinal sectional view of the clamping system according to another embodiment of the invention wherein the two-part nuts can be brought into meshing engagement with the screw threads or grooves of the tie bars when the movable mold comes into contact with the fixed mold.

FIG. 7 is a longitudinal sectional view of one embodiment of such an alternative structure, wherein the screw threads or grooves of the tie bars are brought into meshing engagement with the two-part nuts when the movable mold comes into contact with the fixed mold.

This embodiment will be described with reference to FIGS. 7, 3A, 3B and 4, but the same components as used in FIG. 1 will not be explained.

With reference to FIG. 7, the pistons 5 are slidably received within the clamping cylinders 3. Packings are fit around the pistons 5 so as to prevent leakage of oil. The tie bar is connected to one end of the piston 5. A Ram 53 is coaxially disposed to contact the other end of the piston 5. Each of the clamping cylinders has an internal ram cylinder 52 within which the ram 53 is axially slidable. A packing is also fit around each ram 53 to prevent leakage of oil.

In the illustrated embodiment, the outer diameter of the ram 53 is less than half of that of the tie bar 7 or less than one third or fourth of that of the piston 5. The length of the ram is determined in such a manner that when the two molds are clamped, the front end of the ram 53 comes into contact with the bottom of the ram cylinder 52 before one end of the piston 5 is bought into contact with a free end of the ram cylinder 52.

This embodiment operates in the same manner as in the embodiment shown in FIG. 1 when the molds are clamped together. Specifically, oil is removed from the chambers 5a whereas oil is introduced into ram chambers 5c. This causes the pistons 5, and the rams 53, to move rearwards so as to initiate opening of the two molds.

Illustratively, the ram 53 and the piston are not fixed together. Alternatively, the both members may be fixed together.

The stroke of the clamping cylinder in the present invention is shorter than that of a conventional clamping cylinder. The conventional clamping cylinder is a double acting cylinder and thus requires a sealing member on the piston side. In this case, the inner peripheral surface of the cylinder must be deliberately abraded. Quite differently, in the present invention, the clamping cylinder is a single acting cylinder. This permits a sealing member to be attached to the inner peripheral surface of the cylinder. As a result, the outer peripheral surface of the piston can be easily abraded or the clamping cylinder can be easily manufactured.

The rams are much smaller than the pistons. This arrangement requires less amount of oil when the molds are opened and thus a smaller oil supply system. Also, a shorter molding cycle is sufficient.

Although the preferred embodiments of the present invention have been described in detail, it will be appreciated that the invention is not limited thereto, and various modifications and changes may be made therein without departing from the spirit of the invention and the scope of the appended claims.

What is claimed is:

1. A clamping apparatus comprising:
   a machine base,
   a fixed platen fixedly mounted on the machine base and having a plurality of clamping cylinders and a fixed mold, each clamping cylinder defining a cylinder bore therein, a movable platen having a movable mold, said movable platen being installed on the machine base to move relative to the fixed platen, a plurality of tie bars extending through the movable platen, each tie bar having grooves therearound at a substantially longitudinal center portion thereof, a plurality of pistons slidably situated inside the cylinder bores of the clamping cylinders, each piston being connected to one end of each tie bar, means for moving the movable platen to and from the fixed platen, a plurality of two-part nuts mounted on the movable platen to be engageable with the grooves of the tie bars, said two-part nuts being movable to and from the respective tie bars and along the tie bars, means for moving the two-part nuts to and from the tie bars, and means for moving the two-part nuts along the tie bars, said means including nut boxes fixed to the movable platen and housing the two-part nuts, said nut boxes having threaded holes through which the tie bars extend; adjusting shafts situated inside the respective nut boxes, each adjusting shaft engaging with said threaded hole and having a through hole through which the tie bar extends and a flange with which the two-part nuts slidably contact; and pressing means disposed in the movable platen for pressing the two-part nuts toward the flanges; said two-art nuts being moved along the tie bars by rotating the adjusting shafts and positioned on the tie bars so as to mesh with the grooves of the tie bars when the movable mold is brought into contact with the fixed mold.

2. A clamping apparatus according to claim 1, wherein said grooves are spirally formed around the tie bar to substantially form screw threads.

3. A clamping apparatus according to claim 1, wherein said means for moving said two-part nuts to and from said tie bars comprises hydraulic cylinders.

4. A clamping apparatus according to claim 1, wherein said means for moving said movable platen to and from said fixed platen comprises cylinders fixed to said fixed platen and piston rods each having one end projecting from each of said cylinders and connected to said movable platen.

5. A clamping apparatus comprising:

a machine base, a fixed platen fixedly mounted on the machine base and having a plurality of clamping cylinders and a fixed mold, each clamping cylinder defining a cylinder bore therein and having a ram cylinder and a ram inserted in the ram cylinder, a movable platen having a movable mold, said movable platen being installed on the machine base to move relative to the fixed platen, a plurality of tie bars extending through the movable platen, each tie bar having grooves therearound at a substantially longitudinal center portion thereof, a plurality of pistons slidably situated inside the cylinder bores of the clamping cylinders adjacent the ram cylinder, diameter of the piston being larger than that of the ram, each piston being connected to one end of each tie bar, means for moving the movable platen to and from the fixed platen, a plurality of two-part nuts mounted on the movable platen to be engageable with the grooves of the tie bars, said two-part nuts being movable to and from the respective tie bars and along the tie bars, means for moving the two-part nuts to and from the tie bars, and means for moving the two-part nuts along the tie bars, said two-part nuts being positioned on the tie bars so as to mesh with the grooves of the tie bars when the movable mold is brought into contact with the fixed mold.

6. A clamping apparatus according to claim 5, wherein said grooves are spirally formed around the tie bar to substantially form screw threads.

* * * * *